(12) United States Patent
Dick et al.

(10) Patent No.: US 7,158,505 B2
(45) Date of Patent: Jan. 2, 2007

(54) PERIODIC CELL SEARCH

(75) Inventors: Stephen G. Dick, Nesconset, NY (US); Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 692 days.

(21) Appl. No.: 09/923,263

(22) Filed: Aug. 3, 2001

(65) Prior Publication Data

US 2002/0075833 A1   Jun. 20, 2002

Related U.S. Application Data

(60) Provisional application No. 60/230,123, filed on Sep. 5, 2000, provisional application No. 60/223,405, filed on Aug. 4, 2000.

(51) Int. Cl.
 *H04B 1/10* (2006.01)
(52) U.S. Cl. ........................ 370/350; 370/509
(58) Field of Classification Search ........ 370/335–336, 370/342, 347, 350, 503, 507, 509, 514–515
 See application file for complete search history.

(56) References Cited

U.S. PATENT DOCUMENTS

| | | | |
|---|---|---|---|
| 5,448,570 A | | 9/1995 | Toda et al. |
| 5,809,426 A | | 9/1998 | Radojevic et al. |
| 5,910,948 A | | 6/1999 | Shou et al. |
| 6,014,376 A | | 1/2000 | Abreu et al. |
| 6,038,250 A | | 3/2000 | Shou et al. |
| 6,097,709 A | | 8/2000 | Kuwabara |
| 6,131,030 A | | 10/2000 | Schon et al. |
| 6,223,037 B1 | | 4/2001 | Parkkila |
| 6,246,673 B1 | * | 6/2001 | Tiedemann et al. ......... 370/333 |
| 6,363,060 B1 | * | 3/2002 | Sarkar ......................... 370/342 |
| 6,480,558 B1 | * | 11/2002 | Ottosson et al. ............ 375/350 |
| 6,504,830 B1 | * | 1/2003 | Ostberg et al. ............. 370/342 |

(Continued)

FOREIGN PATENT DOCUMENTS

EP   0 825 737   2/1998

(Continued)

OTHER PUBLICATIONS

Nyström et al., "Comparision of Cell Search Methods for Asynchronous Wideband CDMA Cellular System," International Conference on Universal Personal Communications, IEEE, New York, NY, US, vol. 2, Oct. 5, 1998, pp. 783-787.

(Continued)

*Primary Examiner*—Ricky Q. Ngo
*Assistant Examiner*—Richard Chang
(74) *Attorney, Agent, or Firm*—Volpe and Koenig, P.C.

(57) ABSTRACT

A wireless communication system which comprises a plurality of base stations and a user equipment. Each base station transmits a common primary synchronization code (PSC) in a primary synchronization channel at a different timing within a system frame, and a midamble code in a broadcast channel. A transmitted power level of the PSC and midamble code are at a common fixed ratio for each base station. The user equipment (UE) is capable of conducting cell search and includes a receiver for receiving said PSCs, a signal power measuring device for measuring the power level of received PSCs and identifying a frame timing of received PSCs which exceed a power threshold, and a processor for analyzing data signals received in the primary synchronization channel associated with the PSC with the highest power level of the received PSCs with a threshold exceeding power level. The processor also synchronizes or maintains synchronization with the base station associated with the highest PSC, the data signals including secondary synchronization codes.

34 Claims, 4 Drawing Sheets

U.S. PATENT DOCUMENTS

| | | |
|---|---|---|
| 6,590,881 B1 | 7/2003 | Wallace et al. |
| 6,728,297 B1 * | 4/2004 | Rudolf .................. 375/145 |
| 2002/0146039 A1 | 10/2002 | Demir et al. |

FOREIGN PATENT DOCUMENTS

| | | |
|---|---|---|
| EP | 0852430 | 7/1998 |
| EP | 0954122 | 11/1999 |
| WO | 94/28643 | 12/1994 |
| WO | 9428643 | 12/1994 |
| WO | 99/00912 | 1/1999 |
| WO | 9900912 | 1/1999 |
| WO | 99/44306 | 9/1999 |
| WO | 9944306 | 9/1999 |
| WO | 99/66754 | 12/1999 |
| WO | 9966754 | 12/1999 |
| WO | 00/14907 | 3/2000 |
| WO | 0014907 | 3/2000 |
| WO | 00/31998 | 6/2000 |
| WO | 00/44117 | 7/2000 |
| WO | 01/10160 | 2/2001 |

OTHER PUBLICATIONS

Yahata, "Autonomous Master-Slave Frame Synchronization Among Microcellular Base Stations," Electronics & Communications in Japan, Part I—Communications, Scripta Technica, New York, US, vol. 82, No. 4, Apr. 1999, pp. 1-13.

Nielsen et al., "WCDMA Initial Cell Search", VTC 2000-Fall, IEEE VTS 52nd, Vehicular Technology Conference, vol. 1 of 6, Conf. 52, Sep. 2000, pp. 377-383.

Wang et al., "Cell Search in W-CDMA," IEEE Journal on Selected Areas in Communications, vol. 18, No. 8, Aug. 2000, pp. 1470-1482.

"Universal Mobile Telecommunications System (UMTS); UE Procedures in Idle Mode and Procedures for Cell Reselection in Connected Mode" (3GPP TS 25.304 version 3.5.0 Release 1999).

"UMTS Terrestrial Radio Access Concept Evaluation," ETSI Technical Report, XX, XX, Dec. 1997, pp. 47-48.

Higuchi et al., "Experimental Evaluation of 3-Step Cell Search Method in W-CDMA Mobile Radio," VTC 2000 IEEE, 0-7803-5718-3, pp. 303-307.

Haruki Yahata, Autonomous Master-Slave Frame Synchronization among Microcellular Base Stations, Electronics & Communications in Japan, Part I—Communications, Scripta Technica, New York, U.S., vol. 82, No. 4, Apr. 1999, pp. 1-13.

Wang et al., "Cell Search In W-CDMA," IEEE Journal on Selected Areas in Communications, vol. 18, No. 8, Aug. 2000, pp. 1470-1482.

Nyström et al., "Comparision of Cell Search Methods for Asynchronous Wideband CDMA Cellular System," International Conference on Universal Personal Communications, IEEE, New York, NY, US, vol. 2, Oct. 5, 1998, pp. 783-787.

Yahata, "Autonomous Master-Slave Frame Synchronization Among Microcellular Base Stations," Electronics & Communications in Japan, Part 1 - Communications, Scripta Technica, New York, US, vol. 82, No. 4, Apr. 1999, pp. 1-13.

Nielsen et al., "WCDMA Initial Cell Search", VTC 2000-Fall, IEEE VTS 52nd, Vehicular Technology Conference, vol. 1 of 6, conf. 52, Sep. 2000, pp. 377-383.

"Universal Mobile Telecommunications System (UMTS); UE Procedures in Idle Mode and Procedure for Cell Reselection in Connected Mode" (3GPP TS 25.304 version 3.5.0 Release 1999).

"UMTS Terrestrial Radio Access Concept Evaluation," ETSI Technical Report, XX, XX, Dec. 1997 (Dec. 1997), pp. 47-48.

Higuchi et al., "Experimental Evaluation of 3-Step Cell Method in W-CDMA Mobile Radio," VTC 2000 IEEE, 0-7803-5718-3, pp. 303-307.

* cited by examiner

PERIODIC CELL SEARCH

This application claims priority to Provisional Patent Application No. 60/223,405, filed Aug. 4, 2000 and Provisional Patent Application No. 60/230,123, filed Sep. 5, 2000.

BACKGROUND

The present invention relates to wireless communication systems. More specifically, the present invention relates to cell search in time division duplex communication systems using code division multiple access.

Cell search is a process where a wireless user, user equipment (UE 10), synchronizes with a base station of a cell prior to transmission of traffic data, such as voice data. FIG. 1 is an illustration of a UE 10 in a wireless communication system. Upon activation, the UE 10 is unaware of its location. The UE 10 selects a cell $12_1$ out of a plurality of cells $12_1$ to $12_n(12)$ and its associated base station $14_1$ for communication. Prior to initiating communication, the UE 10 synchronizes both timing and code set to the selected base station $14_1$.

The cell search process involves three steps. In the first step (step 1), the UE 10 identifies nearby base stations $14_1$ to $14_n(14)$. Each base station 14 transmits a primary synchronization code (PSC) in a primary synchronization channel (PSCH).

In a typical time division duplex (TDD) communication system using code division multiple access (CDMA), the PSCH resides in either one timeslot, for case one, or two timeslots for case two, of a fifteen timeslot frame. In case one, the PSCH is transmitted in a timeslot K out of the fifteen timeslots. In case two, the PSCH is transmitted in one of two timeslots, K and K+8. To distinguish between the different base stations 14, each base station 14 transmits its PSC in the PSCH with a particular time offset, $t_{OFFSET}$, from the timeslot boundary.

In step 1, the UE 10 looks for transmitted PSCs from the base stations 14. The UE 10 looks at the one or two PSCH timeslots for received PSCs. Since the PSC is typically unmodulated, such as an unmodulated 256 chips, the search can be performed by looking for peaks in a match filter output over the timeslot(s). Each peak is a potential candidate base station 14 for synchronization.

In step 2, information about each cell is determined, such as the cell's code set, $t_{OFFSET}$, the frame index number within the interleaving period of two frames and the timeslot of the cell's transmitted PSC (for case 2). To determine each cell's information, the UE 10 looks for transmitted secondary synchronization codes (SSCs) transmitted along with each PSC. At each peak, the UE 10 searches for transmitted SSCs. The SSCs may be modulated with data. Based on each base station's detected SSCs and the modulated data, the UE 10 ascertains the cell information.

In step 3, the UE 10 determines the base station $14_1$ for synchronization. For this determination, the UE 10 monitors the broadcast channel (BCH) of the primary common control physical channel (P-CCPCH) for transmitted midambles for each of the potential base stations 14 for synchronization. The base station $14_1$ having the midamble with the highest received power is selected as the base station 14 for synchronization.

To implement this cell search procedure, a tradeoff between complexity and synchronization time exists. To speed up synchronization, matched filters searching all the differing cells' SSCs and midambles may be used. Alternately, fewer reconfigurable matched filters may be used over multiple frames. Using multiple frames, increases the synchronization time but reduces the number of matched filters and other cell search components.

Accordingly, it is desirable to have alternate approaches for cell search.

SUMMARY

A wireless communication system which comprises a plurality of base stations and a user equipment. Each base station transmits a common primary synchronization code (PSC) in a primary synchronization channel at a different timing within a system frame, and a midamble code in a broadcast channel. A transmitted power level of the PSC and midamble code are at a common fixed ratio for each base station. The user equipment (UE) is capable of conducting cell search and includes a receiver for receiving said PSCs, a signal power measuring device for measuring the power level of received PSCs and identifying a frame timing of received PSCs which exceed a power threshold, and a processor for analyzing data signals received in the primary synchronization channel associated with the PSC with the highest power level of the received PSCs with a threshold exceeding power level. The processor also synchronizes or maintains synchronization with the base station associated with the highest PSC, the data signals including secondary synchronization codes.

BRIEF DESCRIPTION OF THE DRAWING(S)

DETAILED DESCRIPTION OF THE PREFERRED EMBODIMENT(S)

Figure 1:
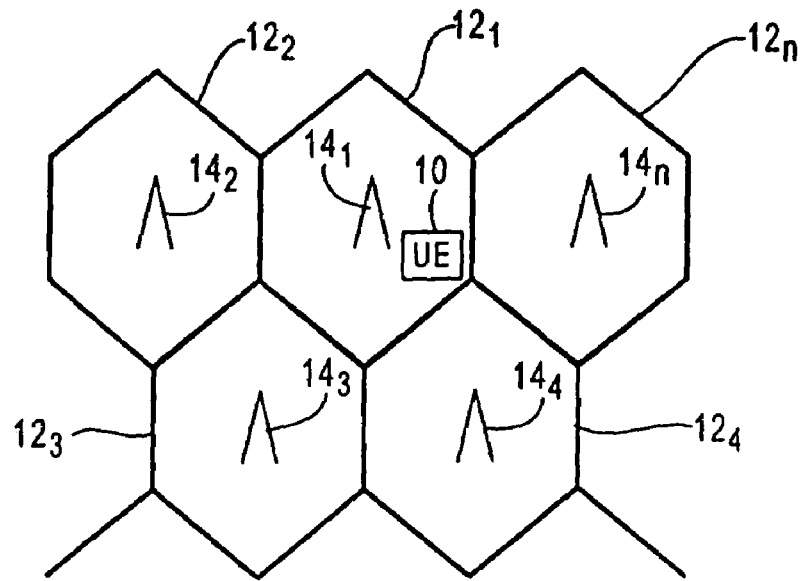
FIG. 1 is an illustration of a user equipment (UE) in a wireless communication system.
Figure 2:
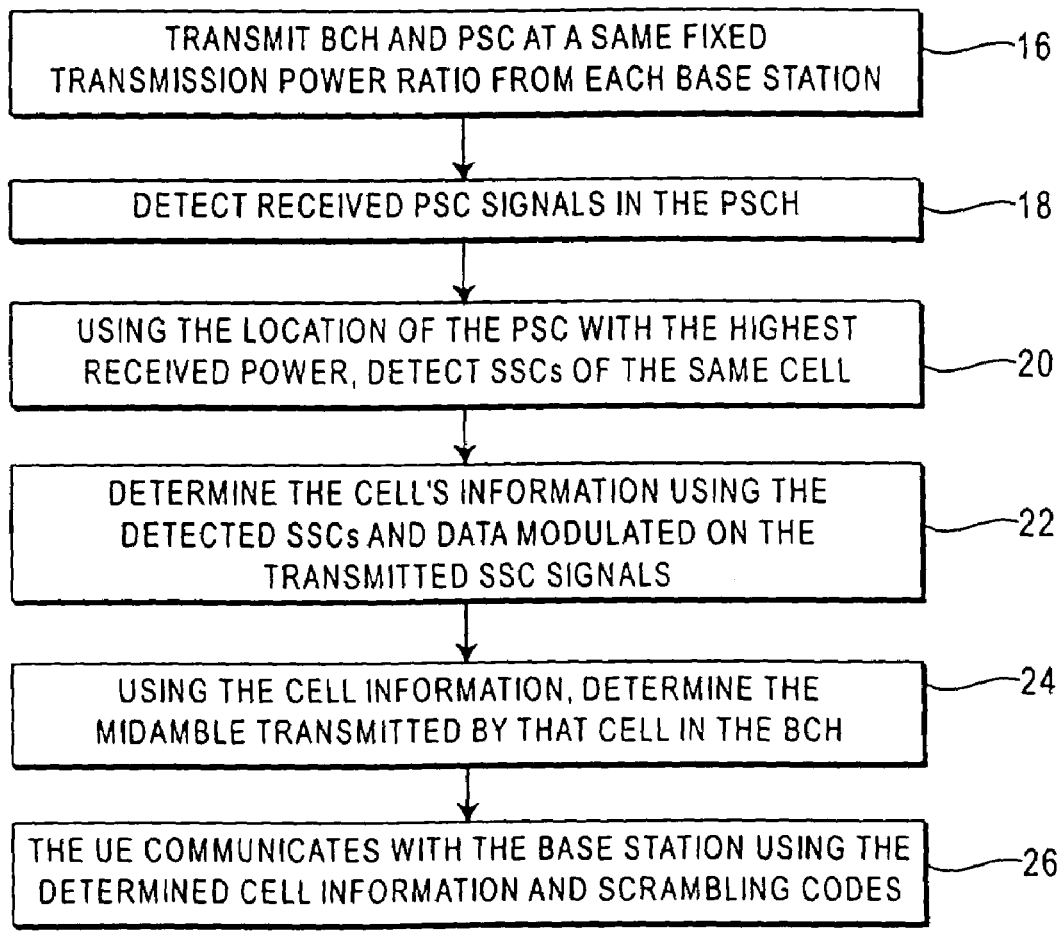
FIG. 2 is a flow chart for cell search.
Figure 3:
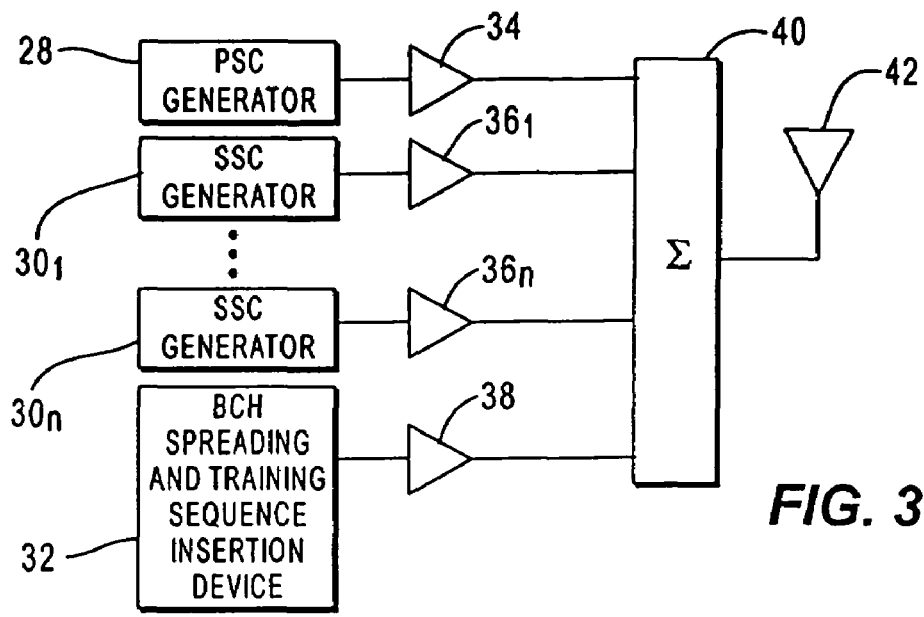
FIG. 3 is a simplified diagram of a base station for use in cell search.

FIG. 2 is a flow chart for cell search. FIG. 3 is a simplified diagram of a base station 14 for use in cell search. The base station 14 includes a PSC generator 28 and multiple SSC generator and modulation devices $30_1$ to $30_n(30)$ for producing the PSC and modulated SSCs at the appropriate timeslot and frame timing associated with the base station 14. A BCH spreading and training sequence insertion device 32 produces a BCH communication burst. The BCH burst is time multiplexed in the timeslot of the BCH and with the appropriate midamble of the base station 14. Amplifiers 34, $36_1$ to $36_n$, 38 associated with each of the PSC, SSC and BCH control the transmission power level of each signal. For certain cell search features, each base station's BCH and PSC transmission power levels are, preferably, set at the same fixed ratio (16). As a result, although the transmission power level of the BCH and PSC may vary cell to cell, the ratio of the transmission power level of the BCH and PSC within each cell 12 is fixed. However, for other cell search features the BCH/PSC fixed ratio is not necessary. The amplified PSC, SSC and BCH are combined by a combiner 40 and radiated by an antenna 42.

Figure 4:
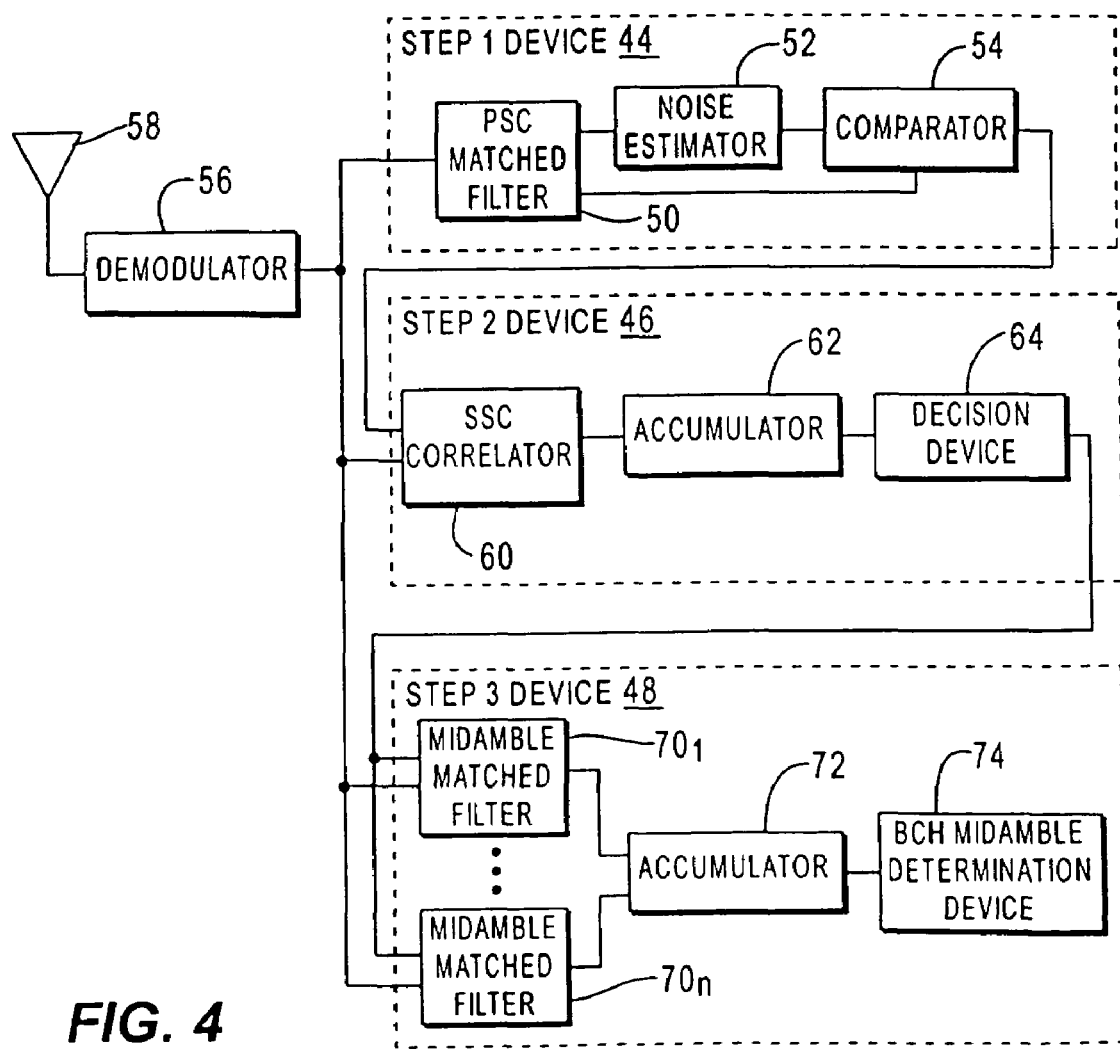
FIG. 4 is a simplified diagram of an initial cell search system of a UE.
Figure 5:
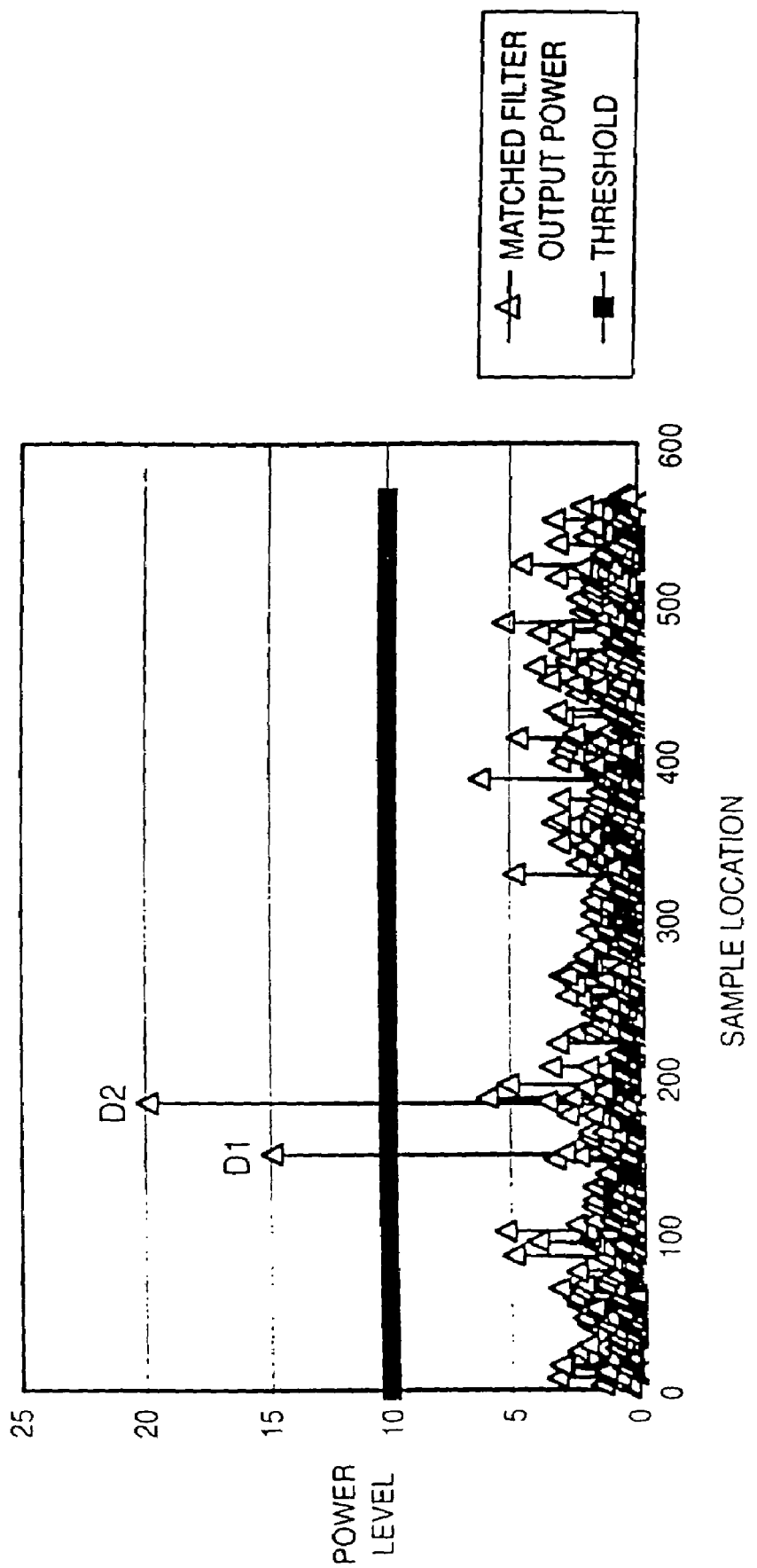
FIG. 5 is a graph of an output from a PSC matched filter.

FIG. 4 is a simplified diagram of a cell search system of a UE 10. Step 1 of the periodic cell search is performed by the step 1 device 44. For case one of a TDD/CDMA system, the step 1 device only searches a single timeslot and for case two, it searches two timeslots. FIG. 3 shows one implementation of a step 1 device 44, although others may be used. The step 1 device 44 comprises a matched filter 50, a noise estimator 52, and a comparator 54. An antenna 58 receives radio frequency signals. After the received signal is demodulated to a baseband signal, such as by a demodulator 56, an input signal I is received and processed by the matched filter 50. The matched filter 50 is matched to the PSC. As illustrated in FIG. 5, the output of the matched filter 52 will be a series of pulses which represent the magnitudes of the received PSC power for those cells detected by the matched filter 50.

The noise estimator 52, coupled to the matched filter 50 and the comparator 54, estimates the noise power of the PSCH which contributes to the received input signal I. One possible noise estimator 52 calculates the power of every point received. The estimator 52 then averages the noise power of these points and outputs this value to the comparator 54.

The outputs from the matched filter 50 and the noise estimator 52 are received by the comparator 54. The comparator 54 determines which of the pulses are likely cell detections. One comparator 54 uses the estimated noise power received from the estimator 52 in order to make this determination. The estimated noise power is used to generate a threshold value, K1. The predetermined value K1 is selected based on maintaining a predetermined false alarm rate for a PSC signal. One such value for K1 is twice the estimated noise power (i.e. 3 dB above the noise power estimate) and another value is four times the noise power (i.e. six decibels above the noise power estimate). This false alarm rate may be fixed or determined on a case by case basis or even on a UE to UE basis.

The comparator 54 then compares each of the received PSCH pulses to the threshold. If the pulse is greater than the threshold, the comparator 54 designates it a cell detection and outputs its location in the frame to the step 2 device 46 (18). The comparator 54 also indicates the pulse having the highest received power. If a pulse is less than the threshold, the comparator ignores the detected power level, assuming it to be a noise spike. Referring back to FIG. 5, the detections marked D1 and D2 illustrate detections that are above a calculated threshold, indicated by the thick horizontal line.

For best performance it is proposed that each base station's ratio of the BCH to the PSCH transmission power level shall be fixed. As a result, the PSCH with the highest received power should correspond to the midamble with the highest received power. Using this assumption, step 2 and step 3 are simplified.

Figure 6:
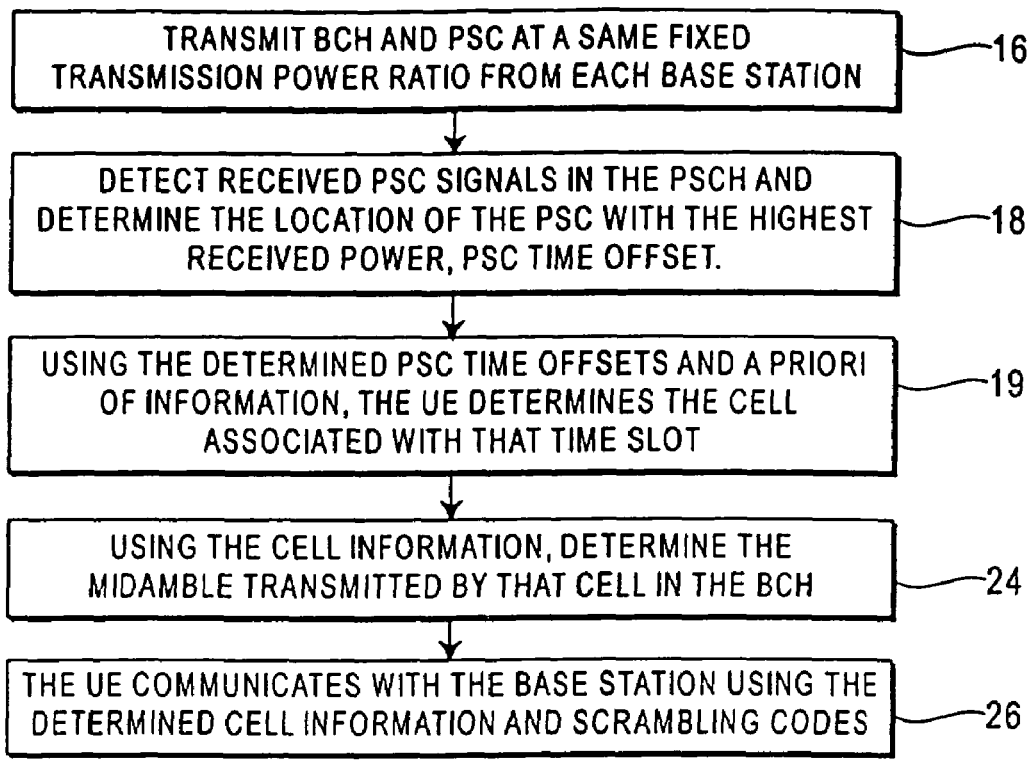
FIG. 6 is a flow chart of cell search using assigned cell time slot information.

Since each cell is assigned a specific time offset, the process may use the location in the frame of the detected PSC to infer the identity of the cell. For greater reliability of a decision, or if a priori cell information is not used, the process may perform Step 2. FIG. 6 is a flow chart for inferring the cell identity using the detected PSC. The UE 10 has a prior knowledge of which cells is assigned a particular time offset. Based on the determined PSC time offset, the UE determines the cell information of the cell using that offset and may skip step 2 (19), shown in FIG. 6. In step 3, along with detecting the BCH midamble, the UE 10 verifies the accuracy of its PSC detection. If the a priori information is not correct, it is assumed that either the PSC detection was a false detection or a cell is not associated with the a priori information.

The step 2 device 46, coupled to the step 1 device 44 and the step 3 device 48, receives the input signal I and location in the frame of each of the detected cells from the comparator 54. Using the location of the cell with the highest received PSC power, the step 2 device 46 determines that cell's SSCs to determine the cell information (20, 22). By using only the specific PSC locations, one per detected PSCH, step 2 is simplified. Demodulation of the SSC takes advantage of knowing the start time, derivable from the detected PSC. Then a simple correlation process, performed by a correlator 60, can be performed to derive the parameters conveyed by the SSC. The demodulation process can provide, as a by-product, a confidence level. This confidence level can be the magnitude of the correlation output corresponding to the selected SSC pattern. The SSC pattern is stored by an accumulator 62.

If the SSC determination process exceeds a confidence level, as determined such as by a decision device 64, there is no need to accumulate additional slot information. The confidence level may be a threshold, such as K2. If the confidence level is not exceeded, the accumulator 62 adds subsequent frame information noncoherently until a confidence level is reached or the frame count exceeds a certain value. After the confidence level is reached, the received SSCs are determined by the decision device 64. Using the detected SSCs and the data modulated on them, cell information, such as the code group, $t_{OFFSET}$, the frame index number and the timeslot of the cell's transmitted PSC (for case 2), is determined. If the confidence level is not exceeded or the SSCs are not consistent with allowed SSC combinations, the original PSC detection is assumed to be a false detect and the PSC with the next highest received power level is processed.

Using the cell information from either the time location of the PSC or the output of step 2, the step 3 device 48 determines the BCH midamble and primary scrambling code of that cell. The code group set determined in step 2 is associated with a set of midamble codes, such as four midamble codes. The input signal I is correlated, such as by matched filters $70_1$ to $70_n$(70), with each midamble code of the set during the BCH. The correlations may be accumulated by an accumulation device 72 over a predetermined number of frames. Based on the accumulated correlations, the BCH midamble for that cell is determined by a BCH midamble determination device 74. Using the determined midamble, the cell's scrambling code is determined. Since only one cell's potential midamble codes are searched, step 3 is also simplified. Accordingly, the complexity of the step 3 hardware is simplified or the step 3 processing time is reduced. Using the cell information from step 2 and the determined scrambling code of step 3, the UE 10 communicates with the selected base station 14 (26).

Figure 7:
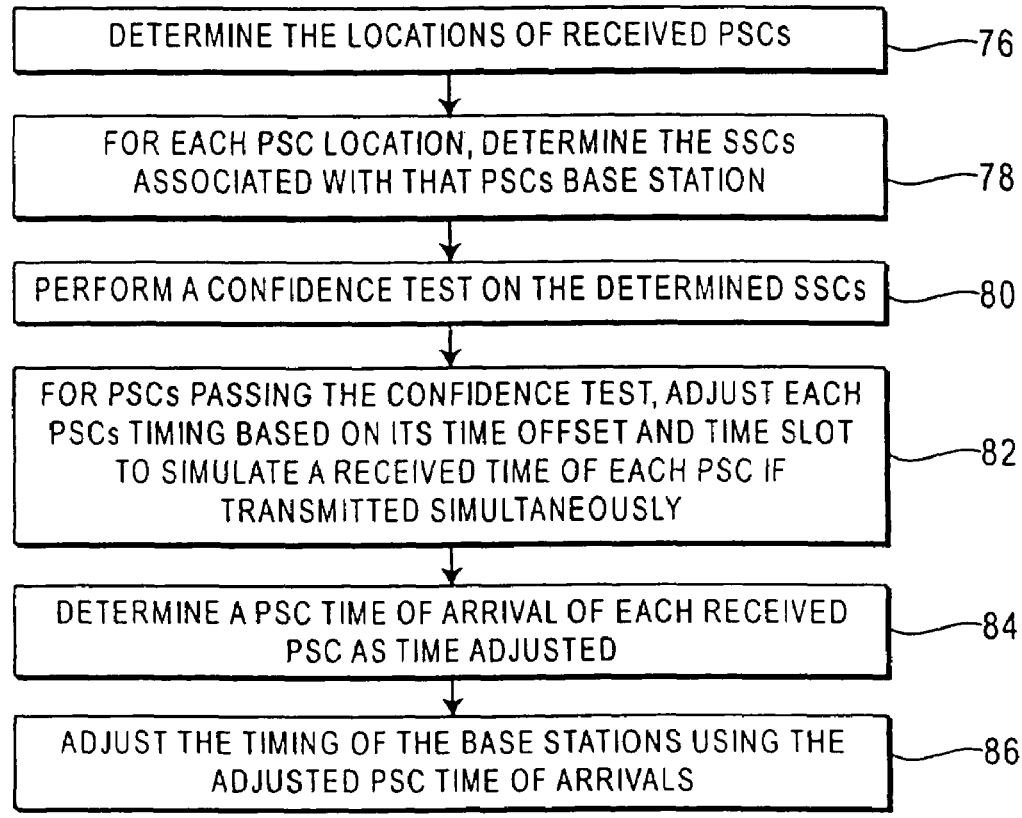
FIG. 7 is a flow chart for base station synchronization using cell search information.

Additionally, cell search information may be used for synchronization of the timing between base stations 14. Although the cell search procedure as previously described may be used for base station synchronization, other cell search approaches may be used for base station synchronization. FIG. 7 is a flow chart for base station synchronization using cell search information from a UE 14.

Using a step 1 device 44, the locations of received PSCs are determined (76). Using the step 2 device 46, the SSCs for each PSC and that cell's time offset and timeslot are determined (78). Preferably, each set of SSCs are passed through a confidence test (80). SSC sets failing the confidence test are discarded. One confidence test compares the received power of the SSCs. The SSC having the highest received power is compared to the second highest received power. If the second highest is not within a specified percentage of the first highest, that PSC detection is discarded.

Since cells 12 transmit PSCs with different time offsets and in different timeslots, the PSC locations are adjusted to compensate (82). Each received cell's adjusted PSC location simulates each cell transmitting the PSC at a same time reference with respect to its own timing. To illustrate, the location of two cell's PSCs are adjusted to simulate each cell transmitting the PSC at the start (no time offset) of slot 0. The time of arrival (TOA) of each PSC as adjusted is determined (84). The TOA information is then used to adjust the base station timing (86).

One approach to synchronize the base station timing uses time distance of arrival (TDOA). The TDOA between each cell pair is determined. Since radio waves travel at the speed of light, using the distance between each cell's base station 14 and the UE 10, the TDOA of perfectly synchronized cells is determined. The UE/base station distance may be known, if the UE 10 is at a fixed location. The UE/base station distance may also be determined by geolocation. By determining the difference between the measured TDOA and the perfectly synchronized TDOA, a timing error is determined. Using the timing error, the radio network controller can adjust a timing of the out of synch base stations 14.

Since base station synchronization does not have to be performed at the same time as cell search, each cell's PSC location, time offset and timeslot information can be gathered over many frames. As a result, additional hardware is not required to perform base station synchronization. Furthermore, by using signals already transmitted by each cell, such as the PSC and SSCs, no further utilization of radio resources is required for base station synchronization.

The TDOA calculation is preferably performed at the radio network controller, although it may be performed at the UE 10 or node-B. For each detected PSC, the base station information of that PSC is determined, such as code group, $t_{OFFSET}$, the frame index number, the timeslot of the transmitted PSC, the received power and the time of arrival relative to the UE's timing. The time of arrival of each PSC is adjusted based on its determined $t_{OFFSET}$ and timeslot. The time of arrival and other cell information are sent to the radio network controller to adjust the base station timing.

To initiate UE time of arrival measurements, the radio network controller may tell the UE 10 to measure a specified base station 14. After the UE 10 measures the TOA of the specified base station 14, it relays the information to the RNC to synchronize the base stations 14. The specified base station 14 may be distinguished at the UE 10 by its associated SSCs. The RNC may also direct the UE 10 to take TOA measurements on all its neighbors. The UE 10 relays all detected neighbors information to the RNC. Preferably, the UE 10 sends a confidence level with each cell's information. One confidence level takes a ratio of the received power of the PSC and compares it to the received power of the SSCs. If the received power levels are close, it indicates a high confidence in the detection.

The RNC takes the cell information and generates a measurement report. The measurement report may contain measurements from one or many UEs 10. The confidence levels are used to weight information for each cell. Accordingly, measurements with a high confidence are weighted higher than low confidence measurements. The history of these measurements can be tracked over time and stored in the report. A Kalman filter can be used to weight the stored information for use in synchronizing the base stations 14.

What is claimed is:

1. A user equipment (UE) for conducting cell search in a wireless communication system having a plurality of base stations, each of which transmits a common primary synchronization code (PSC) in a primary synchronization channel at a different timing within a system frame, and a midamble code in a broadcast channel, a transmitted power level of the PSC and the midamble code being at a common fixed ratio for each of said base stations, the UE comprising;

a receiver configured to receive said PSCs and said midamble codes;

means for identifying a received midamble code having a highest power level, said identifying means including:
 a signal power measuring device for measuring the power level of received PSCs and identifying a frame timing of received PSCs which exceed a power threshold; and
 a processor configured to analyze data signals received in the primary synchronization channel associated with the PSC having the highest power level of said received PSCs which exceeded said power threshold; and said processor further configured to synchronize with the base station associated with the received midamble code identified as having the highest power level.

2. The user equipment of claim 1 wherein said signal power measuring device comprises:

a matched filter matched to the common PSC configured to measure the power level of each of said received PSCs;

a noise estimator configured to determine the noise power received from each transmission of said plurality of base stations and calculating said power threshold; and a comparator configured to determine the power threshold and comparing said power levels of said received PSCs with said threshold and to output the frame timing of said PSC having the highest power level.

3. The user equipment of claim 2 wherein said processor comprises:

an SSC processor, responsive to said frame timing output from said signal power measuring device, which detects said secondary synchronization codes in said primary synchronization channel to identify the base station associated with the frame timing to extract base station information which includes the midamble codes; and a synchronization processor, responsive to said SSC processor, which detects a primary scrambling code.

4. The user equipment of claim 3 wherein said base station information further includes a time offset, frame index number, time slot of the transmitted PSC, received power, and time of arrival relative to the UE.

5. A wireless communication system comprising:

a plurality of base stations, each of which transmits a common primary synchronization code (PSC) in a primary synchronization channel at a different timing within a system frame, and a midamble code in a broadcast channel, a transmitted power level of the PSC and midamble code being a common fixed ratio for each of said base stations; and a user equipment (UE) for conducting cell search, comprising:

a receiver configured to receive said PSCs and said midamble codes;

means to identifying a received midamble code having a highest power level, said identifying means including:
  a signal power measuring device configured to measure the power level of received PSCs and identify a frame timing of received PSCs which exceed a power threshold; and
  a processor configured to analyze data signals received in the primary synchronization channel associated with the PSC having the highest power level of said received PSCs which exceeded said power threshold; and
said processor further configured to synchronize with the base station associated with said received midamble code identified as having the highest power level.

6. The system of claim 5 wherein said signal power measuring device comprises:
  a matched filter matched to the common PSC configured to measure the power level of each of said received PSCs;
  a noise estimator configured to determine the noise power received from each transmission of said plurality of base stations and calculating said power threshold; and
  a comparator configured to determine the power threshold and comparing said power levels of said received PSCs with said threshold and outputting the frame timing of said PSC having the highest power level.

7. The system of claim 6 wherein said processor comprises:
  an SSC processor, responsive to said frame timing output from said signal power measuring device, which detects said secondary synchronization codes in said primary synchronization channel to identify the base station associated with the frame timing to extract base station information which includes the midamble codes; and
  a synchronization processor, responsive to said SSC processor, which detects a primary scrambling code.

8. The system of claim 7 wherein said base station information further includes a time offset, frame index number, time slot of the transmitted PSC, received power, and time of arrival relative to the UE.

9. A method of cell search in a wireless communication system having a plurality of base stations and a user equipment (UE), the method comprising:
  each of said plurality of base stations:
    transmitting a common primary synchronization code (PSC) in a primary synchronization channel at a different timing within a frame; and
    transmitting a midamble code in a broadcast channel, whereby a transmission power level of the midamble code and the PSC is at a fixed common ratio for each of said base stations; and
  at the UE:
    receiving said PSCs and said midamble codes;
    identifying a received midamble code having a highest power level including:
      measuring the power level of received PSCs;
      identifying a frame timing of the PSC with the highest power level of the received PSCs which exceed a power threshold;
      analyzing data signals received in the primary synchronization channel having received PSCs which exceed said power threshold; and
    synchronizing with the base station associated with the received midamble code identified as having the highest power level.

10. The method of claim 9 further comprising the steps of:
  determining said power threshold based upon the noise power received from each transmission of said plurality of base stations;
  comparing said measured power levels of said received PSC with said threshold and outputting the frame timing of said highest PSC;
  detecting secondary synchronization codes in said primary synchronization channel to identify the base station associated with the frame timing to extract base station information which includes said midamble codes; and
  detecting a primary scrambling code.

11. The method of claim 10 wherein said base station information includes a time offset, frame index number, time slot of the transmitted PSC, received power, and time of arrival relative to the UE.

12. A user equipment (UE) conducting cell search in a wireless communication system having a plurality of base stations, each of which transmits a common primary synchronization code (PSC) in a primary synchronization channel at a different timing within a system frame, and a midamble code in a broadcast channel, a transmitted power level of the PSC and the midamble code being at a common fixed ratio for each of said base stations, the UE comprising:
  a receiver configured to receive said PSCs and midamble codes;
  means to identifying received midamble codes that have a power level such that the ratio of a power threshold and the received power level of the midamble code exceeds said common fixed ratio, said identifying means including:
    a signal power measuring device configured to measure the power level of received PSCs and to identify a frame timing of the received PSCs which exceed the power threshold to extract base station information which includes the midamble codes; and
    a processor configured to detect a primary scrambling code associated with the received PSCs which exceed the power threshold; and
  said processor further configured to synchronize with a base station associated with one of the midamble codes identified as having a power level such that the ratio of the power threshold and the received power level of the midamble code exceeds said common fixed ratio.

13. The UE of claim 12 wherein said signal power measuring device comprises:
  a matched filter matched to the common PSC configured to measure the power level of each of said received PSCs;
  a noise estimator configured to determine said power threshold based upon the noise power received from each transmission of said plurality of base stations and calculating said power threshold; and
  a comparator configured to compare said measured power levels of said received PSC with said threshold and outputting the frame timing of the identified PSCs which exceed the power threshold.

14. The UE of claim 13 wherein the identity of the base station associated with received PSCs which exceed the power threshold is known to the UE based on said frame timing, said known identity being used to extract said midamble code.

15. The UE of claim 14 wherein said processor synchronizes to the base station associated with the highest power level of one of said PSCs which exceed the power threshold.

16. The UE of claim 15 wherein said base station information further includes a time offset, frame index number, time slot of the transmitted PSC, received power, and time of arrival relative to the UE.

17. A method of cell search in a wireless communication system having a plurality of base stations and a user equipment (UE), the method comprising:
 each of said plurality of base stations:
  transmitting a common primary synchronization code (PSC) in a primary synchronization channel at a different timing within a frame; and
  transmitting a midamble code in a broadcast channel, whereby a transmission power level of the midamble code and a transmission power level of the PSC is at a common fixed ratio for each of said base stations; and
 at the UE:
  receiving said PSCs and said midamble codes;
  identifying received midamble codes that have a power level such that the ratio of a power threshold and the received power level of the midamble code exceeds said common fixed ratio including:
   measuring the power level of received PSCs;
   identifying a frame timing of the received PSCs which exceed the power threshold to extract base station information which includes the midamble codes; and
   detecting a primary scrambling code associated with the received PSCs which exceed the power threshold in response to said midamble codes; and
  synchronizing with a base station associated with one of the midamble codes identified as having a power level such that the ratio of the power threshold and the received power level of the midamble code exceeds said common fixed ratio.

18. The method of claim 17 further comprising the steps of:
 determining said power threshold based upon the noise power received from each transmission of said plurality of base stations; and
 comparing said measured power levels of said received PSC with said threshold and outputting the frame timing of the identified PSCs which exceed the predetermined power threshold.

19. The method of claim 18 wherein said UE synchronizes to the base station associated with the highest power level of one of said PSCs which exceed the power threshold.

20. The method of claim 18 wherein said base station information further includes a time offset, frame index number, time slot of the transmitted PSC, received power, and time of arrival relative to the UE.

21. A wireless time division duplex communication system comprising:
 a plurality of base stations, each of which transmits a common primary synchronization code (PSC) in a primary synchronization channel at a different timing within a system frame, and a midamble code in a broadcast channel, a transmitted power level of the PSC and the midamble code being at a common fixed ratio for each of said base stations; and
 a UE comprising:
  a receiver configured to receive said PSCs and said midamble codes;
  means for identifying received midamble codes that have a power level such that the ratio of a power threshold and the received power level of the midamble code exceeds said common fixed ratio, said identifying means including:
   a signal power measuring device configured to measure the power level of received PSCs and identify a frame timing of the received PSCs which exceed a power threshold to extract base station information which includes the midamble codes; and
   a processor configured to detect a primary scrambling code associated with the received PSCs which exceed said power threshold; and
  said processor further configured to synchronize with the base station associated with one of the midamble codes identified as having a power level such that the ratio of the power threshold and the received power level of the midamble code exceeds said common fixed ratio.

22. The system of claim 21 wherein said signal power measuring device comprises:
 a matched filter matched to the common PSC configured to measure the power level of each of said received PSCs;
 a noise estimator configured to determine said power threshold based upon the noise power received from each transmission of said plurality of base stations; and
 a comparator configured to compare said measured power levels of said received PSC with said threshold and output the frame timing of the identified PSCs which exceed the power threshold.

23. The system of claim 22 wherein the identity of the base station associated with received PSCs which exceed the power threshold is known to the UE based on said frame timing, said known identity being used to extract said midamble code.

24. The system of claim 23 wherein said UE synchronizes to the base station associated with the highest power level of one of said PSCs which exceed the power threshold.

25. The UE of claim 23 wherein said base station information further includes a time offset, frame index number, time slot of the transmitted PSC, received power, and time of arrival relative to the UE.

26. A wireless time division duplex communication system comprising:
 a plurality of base stations, each of which transmits a common primary synchronization code (PSC) in a primary synchronization channel at a different timing within a system frame, and a midamble code in a broadcast channel, a transmitted power level of the PSC and the midamble code being at a common fixed ratio for each of said base stations; and
 a UE comprising:
  means for receiving said PSCs and said midamble codes;
  means for identifying received midamble codes that have a power level such that the ratio of a power threshold and the received power level of the midamble code exceeds said common fixed ratio, said identifying means including:
   means for measuring the power level of received PSCs and identifying a frame timing of the received PSCs which exceed the power threshold to extract base station information which includes the midamble codes; and
   means for detecting primary scrambling code associated with said received PSCs which exceed the power threshold; and
  means for synchronizing with the base station associated with one of the midamble codes identified as having a power level such that the ratio of the power threshold and the received power level of the midamble code exceeds said common fixed ratio.

27. The system of claim 26 wherein said signal power measuring device comprises:
a means for determining said power threshold based upon the noise power received from each transmission of said plurality of base stations; and
a means for comparing said measured power levels of said received PSCs with said threshold and outputting the frame timing of the identified PSCs which exceed the power threshold.

28. The system of claim 27 wherein the identity of the base station associated with received PSCs which exceed the power threshold is known to the UE based on said frame timing, said known identity being used to extract said midamble code.

29. The system of claim 28 wherein said UE synchronizes to the base station associated with the highest power level of one of said PSCs which exceed the power threshold.

30. The UE of claim 28 wherein said base station information further includes a time offset, frame index number, time slot of the transmitted PSC, received power, and time of arrival relative to the UE.

31. A method of time synchronizing a plurality of base stations in a wireless communication system, the system having a plurality of base stations, each of which transmits a primary synchronization code (PSC) in a primary synchronization channel, wherein each base station's PSC is transmitted in a different timing within a system frame, and a midamble code in a broadcast channel, wherein the PSC and the midamble code are transmitted at a common fixed ratio for each base station, and a user equipment, said method comprising the steps of:
receiving said PSC and midamble code for each of said plurality of base stations;
identifying received midamble codes that have a power level such that the ratio of a power threshold and the received power level of the midamble code exceeds said common fixed ratio including:
measuring a power level of received PSCs;
detecting a frame timing of said PSCs which have a power level greater than the power threshold;
identifying the base stations associated with the midamble codes identified as having a power level such that the ratio of the power threshold and the received power level of the midamble code exceeds said common fixed ratio and extracting base station information including a time offset and time slot of said identified base stations;
adjusting the frame timing of the PSC of said identified base stations in response to said time offset;
calculating a time of arrival (TOA) for each of said adjusted PSC's frame timing; and
adjusting a timing of said base station in response to said TOAs.

32. The method of claim 31 wherein the step of identifying the base stations includes the steps of:
detecting secondary synchronization codes (SSCs) in said primary synchronization channel; and
performing a confidence test on said SSCs.

33. The method of claim 31 wherein the step of adjusting said frame timing in response to said TOA includes the steps of:
calculating a time distance of arrival (TDOA) for each of said identified base stations using the TOA;
comparing said calculated TDOA to a stored TDOA; and
generating a timing error based on said comparison.

34. The method of claim 33 wherein a transmitted power level of the midamble code and the PSC being a common fixed ratio for each of said base stations.

* * * * *

UNITED STATES PATENT AND TRADEMARK OFFICE
CERTIFICATE OF CORRECTION

PATENT NO. : 7,158,505 B2
APPLICATION NO. : 09/923263
DATED : January 2, 2007
INVENTOR(S) : Dick et al.

It is certified that error appears in the above-identified patent and that said Letters Patent is hereby corrected as shown below:

ON THE TITLE PAGE

At Item (56), OTHER PUBLICATIONS, page 2, right column, line 25, after the words "Mode and", delete "Procedure" and insert therefor --Procedures--.

At Item (56), OTHER PUBLICATIONS, page 2, right column, line 29, before the word "Method", insert --Search--.

IN THE SPECIFICATION

At column 2, line 1, after the word "frame", delete ",".

At column 3, line 14, before the word "will", delete "52" and insert therefor --50--.

At column 3, line 62, after the word "has", delete "a prior" and insert therefor --a priori--.

At column 3, line 62, before the word "assigned", delete "is" and insert therefor --are--.

IN THE CLAIMS

At claim 5, column 7, line 1, after the word "means", delete "to" and insert therefor --for--.

At claim 12, column 8, line 18, after "(UE)", insert --for--.

At claim 12, column 8, line 28, after the word "means", delete "to identifying" and insert therefor --for identifying a--.

UNITED STATES PATENT AND TRADEMARK OFFICE
CERTIFICATE OF CORRECTION

PATENT NO. : 7,158,505 B2
APPLICATION NO. : 09/923263
DATED : January 2, 2007
INVENTOR(S) : Dick et al.

It is certified that error appears in the above-identified patent and that said Letters Patent is hereby corrected as shown below:

At claim 21, column 10, line 6, before the word "power", delete "a" and insert therefor --the--.

Signed and Sealed this

Fifteenth Day of July, 2008

JON W. DUDAS
*Director of the United States Patent and Trademark Office*